United States Patent
Luskin et al.

(10) Patent No.: US 7,317,974 B2
(45) Date of Patent: Jan. 8, 2008

(54) REMOTE VEHICLE SYSTEM MANAGEMENT

(75) Inventors: Eugene Luskin, Issaquah, WA (US); Andrew Petrochuk, Bellevue, WA (US); David Kizhnerman, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 583 days.

(21) Appl. No.: 10/734,515

(22) Filed: Dec. 12, 2003

(65) Prior Publication Data
US 2005/0131585 A1 Jun. 16, 2005

(51) Int. Cl.
*G01M 17/00* (2006.01)
(52) U.S. Cl. .............................. 701/29; 701/32; 701/33
(58) Field of Classification Search .................... 701/1, 701/29, 30, 31, 33, 35, 36
See application file for complete search history.

(56) References Cited

U.S. PATENT DOCUMENTS

| | | | |
|---|---|---|---|
| 5,794,164 A | 8/1998 | Beckert et al. | |
| 6,182,010 B1 | 1/2001 | Berstis | |
| 6,202,008 B1 | 3/2001 | Beckert et al. | |
| 6,339,736 B1 | 1/2002 | Moskowitz et al. | |
| 6,370,449 B1 * | 4/2002 | Razavi et al. | 701/1 |
| 7,003,289 B1 * | 2/2006 | Kolls | 455/422.1 |

\* cited by examiner

*Primary Examiner*—Richard M. Camby
(74) *Attorney, Agent, or Firm*—Lee & Hayes, PLLC

(57) ABSTRACT

A method includes collecting vehicle system data from one or more vehicle systems in a vehicle and generating a browsable network document including the vehicle system data from a vehicle-based network server. A vehicle-based system includes one or more vehicle systems collecting and using vehicle system data and a means for communicating the vehicle system data over a network for remotely managing the one or more vehicle systems.

37 Claims, 8 Drawing Sheets

REMOTE VEHICLE SYSTEM MANAGEMENT

CROSS-REFERENCE TO RELATED APPLICATIONS

The present application is related to concurrently filed U.S. patent application Ser. No. 10/735,393 entitled "SMART VEHICLE VIDEO MANAGEMENT", and U.S. patent application Ser. No. 10/735,382 entitled "ENHANCED VEHICLE EVENT INFORMATION", both of which are assigned to the Assignee of the present application.

TECHNICAL FIELD

The described subject matter relates to vehicle systems. More particularly, the subject matter relates to remote vehicle system management.

BACKGROUND

As automobiles and other vehicles advance, more information is used and generated by the vehicles both in terms of quantity and types of information. For example, modern automobiles store a user profile that can include data about a driver's preferred seat position, preferred temperature, and preferred radio stations. Infotainment systems, global positioning systems and on-board diagnostic systems in automobiles also provide and use large amounts of data. Such vehicle systems can greatly improve the transportation experience offered by the vehicle. Typically, each type of vehicle data is handled independently by an independent vehicle system related to the particular type of data.

To retrieve data from a vehicle or update data in a vehicle system, a physical connection is typically made to the vehicle system, whereby the data can be accessed. For vehicle system data to be updated or accessed, a user must be physically present at the vehicle or system. For example, to retrieve data from an on-board diagnostic (OBD) system, a mechanic connects an OBD reader to the OBD system to read the OBD codes. As another example, user media such as music can be loaded using compact disk (CD) player installed in the vehicle. As another example, user profile data can be changed by a driver through manipulation of certain buttons or use of a user interface. Each system typically has a dedicated, separate interface. Certain vehicle systems usually have no information about the presence of each other; i.e., these vehicle systems are typically not aware of each other. For example, GPS is not aware of a vehicle-based infotainment system, and an OBD system is not aware of GPS system, etc.

Another drawback to current vehicle systems is that user interfaces for vehicle systems are typically very limited, partly because the separate vehicle systems do not interact. Various types of vehicle system data are available in modern vehicles, but the vehicle systems operating on the vehicle system data have been developed and deployed separately. Thus, the information from various systems is not presentable or updateable remotely or through one common user interface.

SUMMARY

Implementations of systems and methods described and claimed herein solve the discussed problems, and other problems, by providing for remote vehicle system management. A server in a vehicle accesses data related to separate vehicle systems. The server can generate a network document, which is accessible by a remote client. The server can respond to network requests to access or update vehicle system data.

An implementation of a method includes generating a browsable network document by a vehicle-based server, the browsable network document having vehicle system data. The method may further include receiving a network request for vehicle system data. The method may further include receiving vehicle system configuration data related to a configurable vehicle system and updating the configurable vehicle system.

An implementation of a vehicle includes a vehicle-based web server generating a web page including vehicle system data. A network communications module transmits the network document over a network. The web server may further receive a network request for vehicle system data and responsively generate a web page having the requested vehicle system data. The web server may also receive configuration data related to a configurable vehicle system and update the configurable vehicle system. The web server may also encrypt network documents and decrypt network requests to protect sensitive vehicle information and change requests.

An implementation of a vehicle management system includes at least one interface to a vehicle system and a network server receiving data from the vehicle system. The network server generates a browsable network document having the vehicle system data. The network server may generate the network document in response to a client request for the vehicle system data. The at least one interface may include an interface to at least one of a GPS, an On-Board Diagnostics (OBD) system and a media player.

An implementation of a computer program product provides a computer program storage medium readable by a computer system and encoding a computer program that accesses vehicle system data for configuring a system in a vehicle or communicating data from a system in the vehicle to a client in a browsable network document having vehicle system data.

DETAILED DESCRIPTION

Overview

Exemplary implementations of methods, systems, devices, computer program products, and data structures are disclosed for remotely managing one or more systems in a vehicle. Traditional systems and methods for managing vehicle systems involve being physically present at the vehicle and creating a physical connection to manage systems through user interfaces that are different for each vehicle system. Implementations described herein provide for remote management of vehicle-based systems through a vehicle-based server that can generate a network document and receive network requests for data related to one or more vehicle-based systems.

Exemplary Operating Environment

Figure 1:
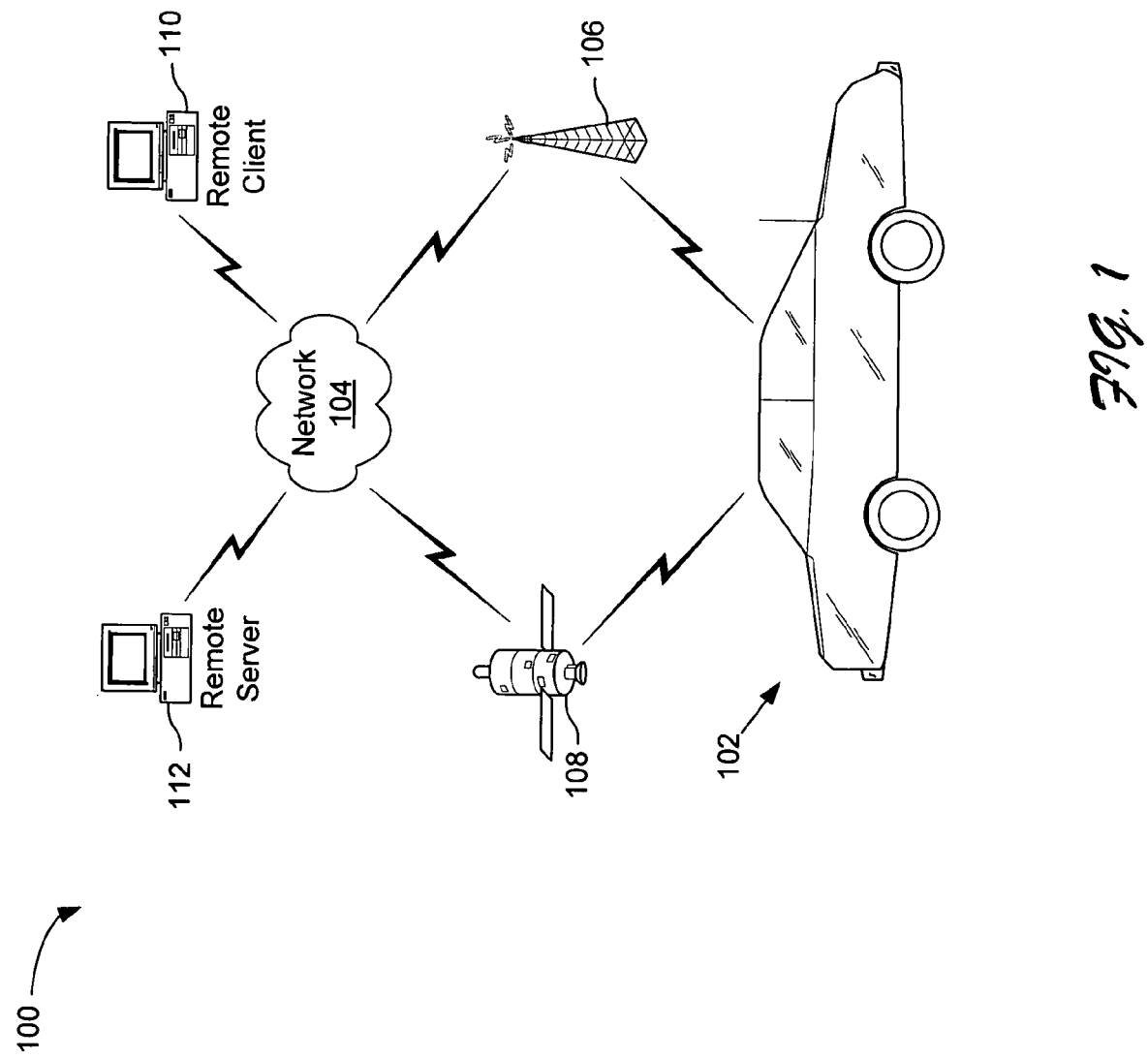
FIG. 1 illustrates an exemplary operating environment in which a remote vehicle system management scheme may be employed.

FIG. 1 illustrates an exemplary operating environment 100 in which a remote vehicle system management scheme may be employed. The environment 100 includes a vehicle 102 that includes one or more vehicle systems. As used herein a vehicle system is any on-board system that provides data about operation of the vehicle. Examples of vehicle systems are control systems, diagnostics systems, entertainment systems, and navigation systems.

A vehicle-based computer (not shown) located within or on the vehicle 102 can communicate data related to the vehicle system(s) over a network 104. As illustrated, the vehicle 102 may communicate with a satellite 108 and/or a cell tower 106 to access the network 104. Via the network 104, the vehicle-based computer can communicate with remote computing devices, such as, but not limited to, a remote client 110 (e.g., a desktop computer) or a remote server computer 112.

The network 104 may include a number of interconnected sub-networks. For example, the network 104 may be the Internet. The network 104 may also include a satellite, telephone land-line, or wireless network. The network 104 facilitates communication among computing devices using a communication protocol. Exemplary communication protocols are TCP/IP, HTTP, and SOAP.

Regardless of the particular network 104 or communication protocol used, one or more computer systems in the vehicle 102 can use the network 104 to communicate with the remote server 112 and the remote client 110, as long as the remote server 112 and remote client 110 support the communication protocol. Although illustrated as desktop computers, the remote client 110 and remote server 112 may be implemented with other known computing devices, such as, but not limited to, handheld computers, laptops, cell phones, Personal Digital Assistants (PDAs), or others. Such devices typically include a network application, such as, but not limited to, INTERNET EXPLORER from MICROSOFT Corporation, that enables the devices to transmit and receive data to and from the network 104.

A vehicle-based computer can generate a browsable network document, such as a web page definition, which includes vehicle system data from vehicle systems. The browsable network document can be transmitted to the remote server 112 or the remote client 110, where the vehicle system data may be browsed. Network applications typically include a browser utility that enables a user of the remote server 112 or remote client 110 to view electronic documents from the network 104. Systems in the vehicle 102 can generate such browsable documents for distribution over the network 104. Such browsable documents can include vehicle system data, such as, but not limited to, Global Positioning System (GPS) data, user configuration data, or On-Board Diagnostics II (OBD-II) data, from systems in the vehicle 102.

The remote client 110 or server 112 may also be enabled to upload data to the vehicle-based computer in the vehicle 102. Data that is uploaded to the vehicle 102 may be used by one or more vehicle systems in the vehicle 102. Such data may include user data, updates, system configurations, or settings. For example, a GPS or mapping system in the vehicle 102 may be updated with the most up-to-date maps of city streets or facilities, etc. As another example, a user of the vehicle 102 can upload music, videos, or other types of media to the vehicle 102. Systems in the vehicle 102 receive and store the uploaded data for use in the vehicle 102.

In addition, the systems in the vehicle 102 can receive requests from the network 104 for particular information from the vehicle 102. For example, a browsable web page from the vehicle 102 may include entry fields in which a user of the remote client 110 can enter a request for a particular type or types of vehicle data, such as GPS data or OBD data. The systems in the vehicle 102 can generate a browsable network document that includes the requested vehicle data. In one implementation, a vehicle computer can combine different data types from different systems in the vehicle 102 to create a more informative presentation of vehicle systems, than may otherwise be possible using each system separately.

A remote computer management scheme as described herein may be beneficially implemented in any mobile vehicle. Thus, the vehicle 102 is not limited to any particular type of vehicle. For example, the vehicle 102 may be an automobile. As another example, the vehicle 102 may be a farm tractor. As yet another example, the vehicle 102 may be a grader, a back-hoe, a paver, or other heavy equipment. Other examples of vehicles include boats, airplanes, or helicopters.

Figure 2:
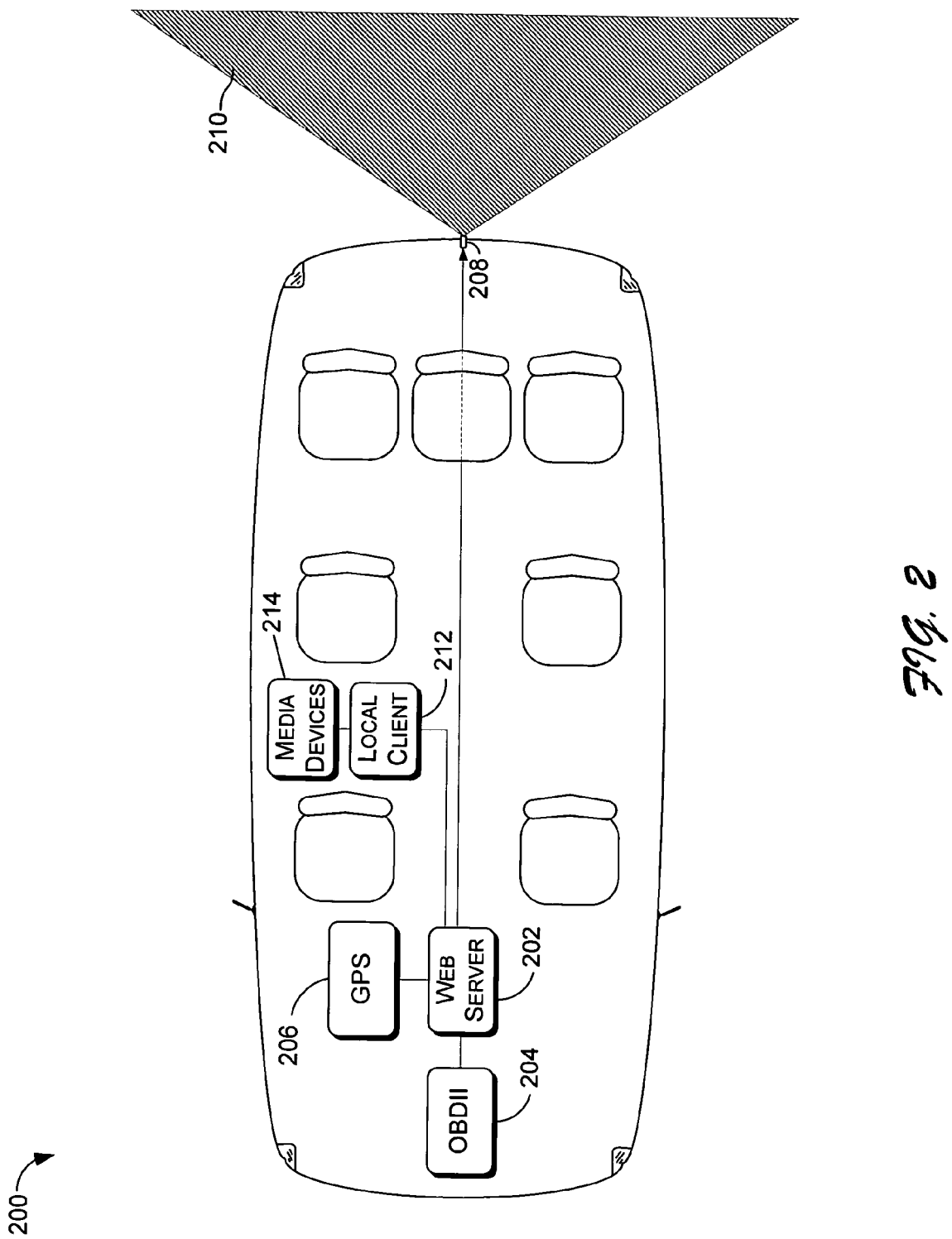
FIG. 2 illustrates a plan view of a vehicle operable to employ remote vehicle system management.

FIG. 2 is a plan view of a vehicle 200 having systems operable to employ remote vehicle computer management. The vehicle 200 includes a web server computer 202 that is network enabled for communicating on a network. As such, the server 202 is operable to collect data from one or more vehicle systems and generate browsable network documents including the collected data. In addition, the web server 202 is operable to receive data from a network and store the received data in memory for use by the systems in the vehicle 200.

Exemplary vehicle systems, an On-Board Diagnostics II (OBDII) system 204, a GPS 206, and a video camera 208 are installed in the vehicle 200. Such systems generate and/or use associated data to facilitate tasks for a driver, other occupants of the vehicle, or remote clients of the server computer 202. For example, the OBDII system 204 generate error codes or event codes indicative of vehicle system errors or events that can be presented to the driver of the vehicle, or a mechanic who is remotely logged-in to the server computer 202.

As another example, the GPS 206 may employ map data that can be downloaded from a network and illustrated to occupants of the vehicle 200. As a further example, video images from the video camera 208 may be presented to occupants of the vehicle 200 or transmitted to a remote client over a network. As shown, the video camera 208 is directed to capture a rear view 210 behind the vehicle 200. In other implementations, the video camera 208 may be directed toward the front or sides of the vehicle 200 to capture other views. While not shown, other systems, such as obstacle sensors or a vehicle security system, may be installed in or on the vehicle 200 and communicate with the server 202.

A local client 212 can be installed in the vehicle 200 and used by occupants of the vehicle 200. The local client 212 may be a portable computing device, such as a handheld computer, a PDA, a cell phone, or a laptop. The local client 212 may also be mounted in or on the vehicle 200. Media devices 214 are input/output devices through which a vehicle occupant can interact with the local client 212 and/or the web server 202. Exemplary media devices include speakers and video screens. Thus, for example, a video screen can show a map of the current position of the vehicle 200 from the GPS system 206.

The web server 202 may also utilize media devices for data input/output. Like the client 212, the web server 202 may be a portable device or arranged in a casing or housing that is installed in one of various locations in the vehicle 200. One exemplary housing has a standardized size expressed in terms of Deutsche Industry Normen (DINs). The housing may be installed in the dashboard of the vehicle 200, under a floor board of the vehicle 200, in the trunk of the vehicle 200, or other convenient location, from which the web server 202 may communicate with vehicle systems.

Figure 3:
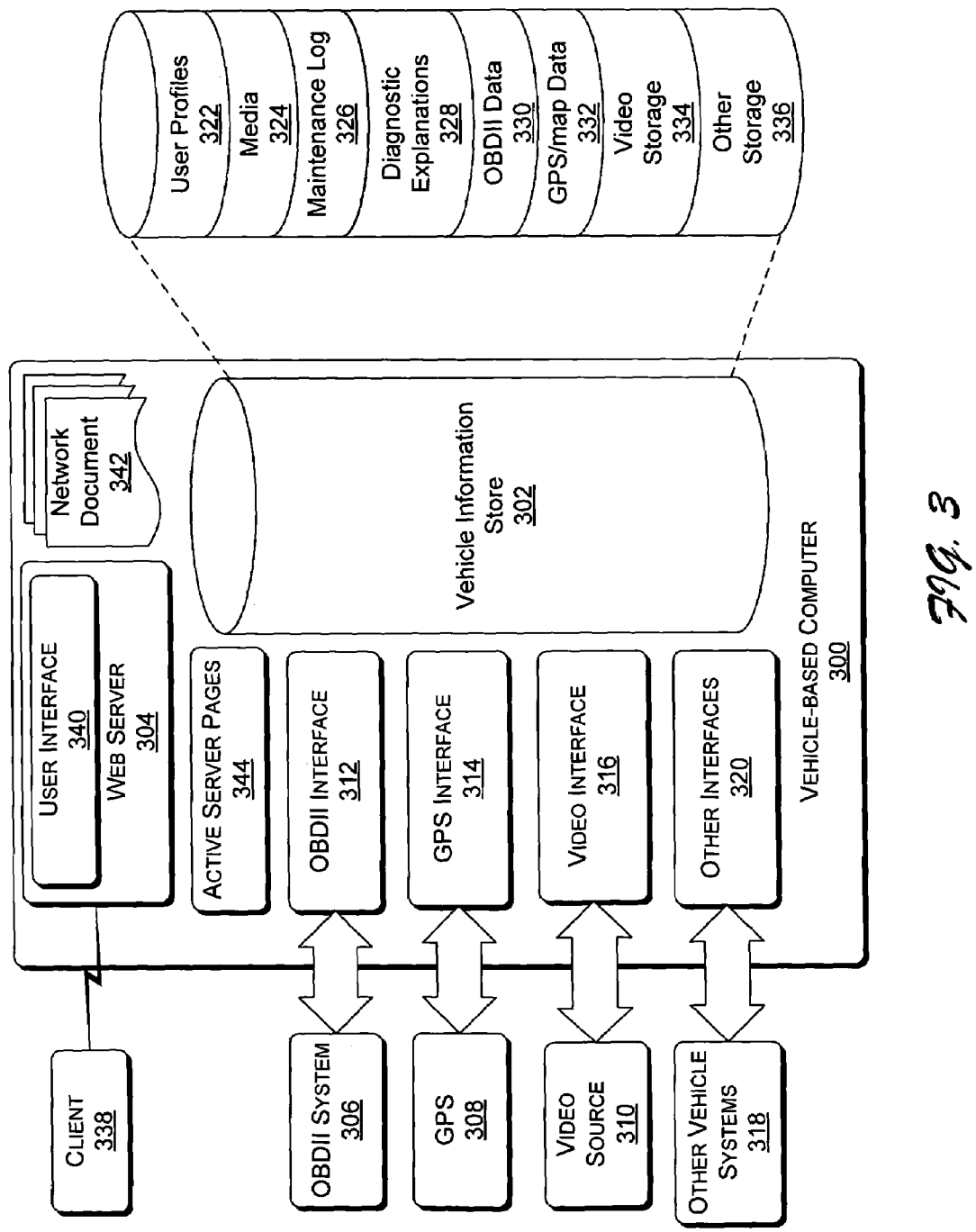
FIG. 3 illustrates a block diagram of an exemplary vehicle-based computer system that enables remote vehicle system management.

FIG. 3 is a block diagram of an exemplary vehicle-based computer 300 that enables remote vehicle system management. The vehicle-based computer 300 includes one or more vehicle system interfaces for interacting with the vehicle systems. The vehicle-based computer 300 includes memory, such as a vehicle information store 302, for storing data associated with the one or more vehicle systems. A server application 304 communicates with the system interfaces to update and upload vehicle system data. Using the interfaces and memories, the server application 304 can retrieve and manage data generated and/or used by the vehicle systems.

Exemplary vehicle systems include an OBDII system 306, a GPS system 308, and a video source 310, as shown in FIG. 3. The OBDII system 306 detects OBDII vehicle events and errors and outputs codes (herein referred to as raw OBDII data) representing the errors and events when they occur. The GPS system 308 is in communication with one or more satellites to determine the current location of the vehicle and generate vehicle location data, such as latitude and longitude.

The video system 310 includes one or more video capturing devices, such as video cameras, which generate images of views around the vehicle. Many other vehicle systems in addition to those shown in FIG. 3 may communicate with the vehicle-based computer 300. The vehicle-based computer 300 includes an OBDII interface 312, a GPS interface 314, and a video interface 316 that interface with the OBDII system 306, the GPS system 308, and the video system 310, respectively.

The OBDII interface 312 interfaces with the OBDII system 306 via a Data Link Connector (DLC), which is physical connector specified in the OBDII specification. The OBDII interface 312 retrieves the raw OBDII data from the OBDII system 306 in real time. The OBDII interface 312 may then format and store the OBDII data in the vehicle information store 302 for presentation or use with other system data. The OBDII interface 312 can also update a set of OBDII error codes and events as the OBDII standard changes.

With regard to the GPS interface 314, location data from the GPS system 308 is received by the GPS interface 314 and formatted and stored for presentation and/or use with other vehicle system data. The GPS interface 314 may periodically store the location data in memory with a timestamp obtained from a clock in the vehicle-based computer 300. The GPS interface 314 can update map information, including Geographic Information System (GIS) data, which can be provided by the server application 304. One particular application that can serve as the GPS interface 314 is MAPPOINT by MICROSOFT Corporation.

The video interface 316 receives image data from the video system 310 and stores the image data in the vehicle information store 302. The image data may be stored with a timestamp for later retrieval and/or association with other vehicle system data. The amount of image data that can be store may depend on the amount of memory available in the vehicle information store 302, and is typically implementation specific.

Other vehicle systems 318 are other vehicle systems that may generate or use data during operation. For example, the other vehicle systems 318 can include a vehicle security system, an obstacle detection system, media systems, vehicle environment systems (e.g., temperature control), and sound systems. Other interfaces 320 are provided as necessary for interfacing with other vehicle systems 318. Other interfaces 320 receive data from and send data to other vehicle systems 318. Data received from other vehicle systems 318 may be stored in the vehicle information store 302.

One or more of the vehicle systems 306, 308, 310, and/or 318, or their corresponding interfaces may be configurable. For example, a media system in the other systems 318 may be configured with a list of music selections. As another example, the GPS system 308 and/or the GPS interface 314 may be configured with updated map, GIS, or satellite data. Such configuration data may be received from a network and updated in memory, such as the vehicle information store 302. The configuration data may also be downloaded from a magnetic disk, a memory card, or other memory device. When configuration data is received for a particular vehicle system, the appropriate interface updates the vehicle system or interface.

The vehicle information store 302 includes a repository for information from one or more vehicle systems. One implementation of the vehicle information store 302 includes a relational database. As shown, the vehicle information store 302 includes, but is not limited to, memory associated with each of the vehicle systems shown in FIG. 3. User profiles 322 is a repository for user profile information pertaining to user preferred settings. Thus, for example, user profile information in the user profiles 322 may be indexable by user name or user identifier. Media 324 includes media data that can be presented on a client device. Exemplary media include musical tracks, other audio, and video.

A maintenance log 326 includes a history of vehicle maintenance. For example, oil changes, repairs, and other vehicle maintenance may be recorded in the maintenance log 326. Diagnostics explanations 328 are graphical and textual explanations of OBDII errors and events. Because many users may not be experts in car diagnostics, the graphical and textual explanations are provided to explain OBDII errors and events in terms understandable by a layperson. When an OBDII error or event is detected, associated graphical and/or textual explanations can be retrieved from the diagnostics explanations 328 and presented to a user.

An OBDII data store 330 is a repository for OBDII events and errors, which can be stored as errors and events are detected. The events and errors can be used to identify associated diagnostics explanations 328 for presentation to a user. The stored errors and events in the OBDII data store 330 can also be related to GPS locations and/or map data that are stored in a GPS/map data store 332. Thus, for example, a map can be presented with a marker where a particular OBDII error or event was detected.

Video storage 334 is a repository for video images captured by the video source 310. As discussed above, the video interface 316 can store captured video image data in the video storage 334. Video images in the video storage 334 can be presented on a display device connected to the vehicle-based computer 300 and/or a display device connected to a client computer in communication with the vehicle-based computer 300. Other storage 336 may be used to store any other data used by the vehicle-based computer 300. For example, other storage 336 may include data from other vehicle systems 318.

Although the vehicle information store 302 is depicted as a relational database in FIG. 3, it is to be understood that any type of memory configuration can be used to implement the vehicle information store 302. By way of example, and not limitation, the vehicle information store 302 can be implemented using a solid state memory, flash memory, and memory cards.

The server 304 provides services and interfaces to a client 338 for accessing and/or updating vehicle information storage 302. The server 304 communicates with the client 338 via a network communication port. The client 338 may be either remote or local. Exemplary local and remote clients 338 are described above with respect to FIG. 1 and FIG. 2.

The server 304 provides data according to the network protocol such that data from the vehicle can be distributed to the client 338 over the network. The server 304 presents a user interface 340 through which a user at the client 338 can interface with the server 304. One implementation of the user interface 340 is a network document 342, such as a web page, that is browsable by a browser application executing on the client 338. A network document includes text and/or other data organized according to a markup language that is readable by a network document reader, such as a browser. Popular network document markup languages are Hypertext Markup Language (HTML), Standard Generalized Markup Language (SGML), and Extensible Markup Language (XML).

The user interface 340 can include selectable symbols, such as hyperlinks to other web pages 342, which are also browsable by the client 338. In addition to hyperlinks, the user interface 340 and other web pages 342 can include other selectable and non-selectable symbols, such as images, graphics, text, text entry fields, and tables.

The other web pages 344 can include information from the vehicle information storage 302. In one implementation, the web server 304 includes a common gateway interface (CGI) for responding to network requests by creating a web page. The web server 304 can, for example, populate an HTML template web page with OBDII error and event codes, along with a time of each error and event code. In another implementation, the web server 304 can use an active server pages application 344 to generate the web page(s) 342.

One exemplary implementation of an active server pages application 344 is ASP NET produced by MICROSOFT Corporation. The web page(s) 342 can include embedded objects, such as Flash video clips and web controls from a runtime engine. The NET runtime engine from MICROSOFT is one such runtime engine that can interact with the server 304 to facilitate creation and distribution of web pages from a vehicle-based computer.

In addition, using an internet protocol (IP) address for the server 304, the client 338 can request data from the server 304. The server 304 may include database server functionality, by which the server 304 can query the vehicle information storage 302 to satisfy client 338 requests. The server 304 includes relational functionality whereby one type of data from the vehicle information storage 302 can be related to and presented with other types of data from the vehicle information storage 302.

Figure 4:
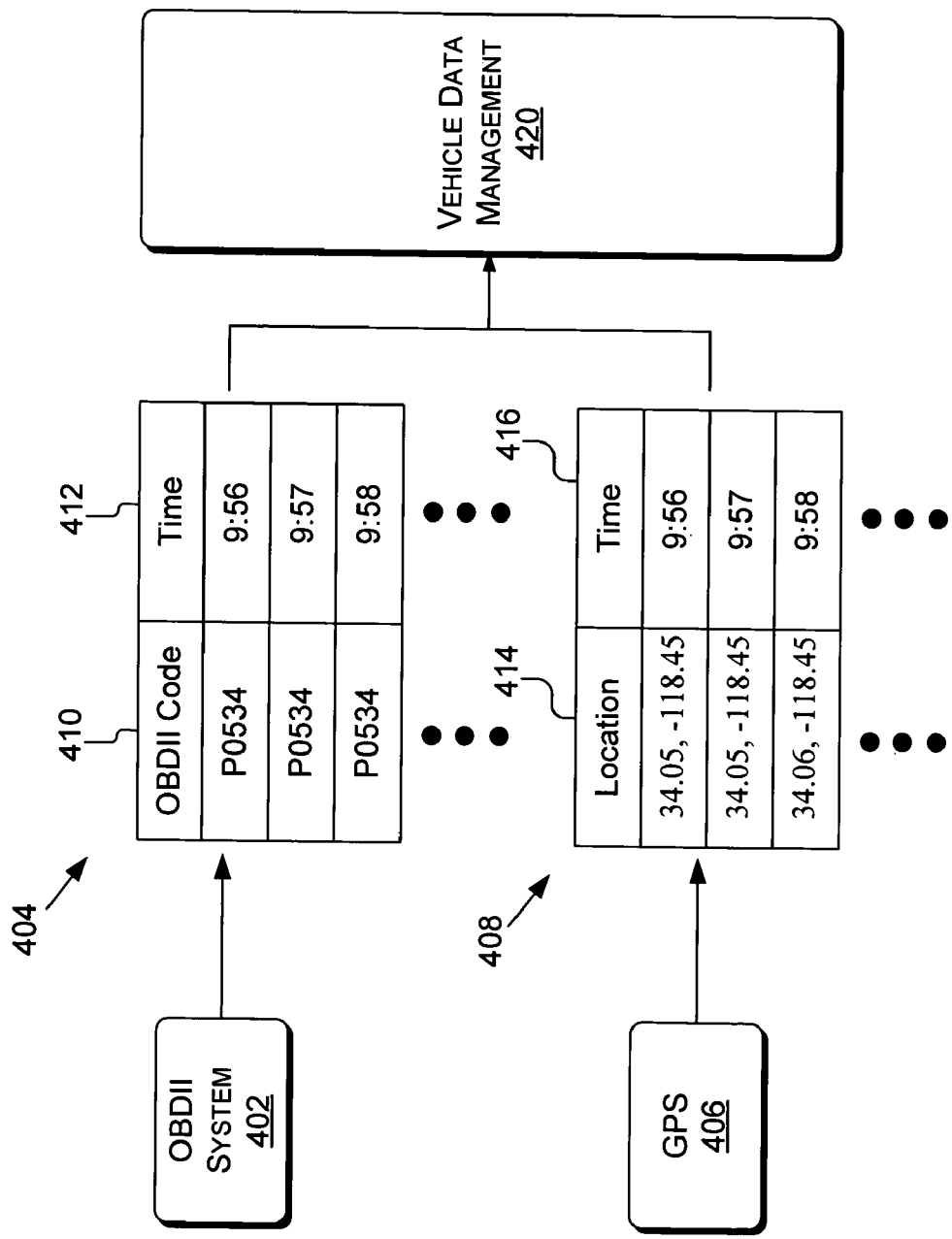
FIG. 4 illustrates an exemplary arrangement of vehicle systems, vehicle system data, and a relational database application that can collect and relate vehicle system data.

FIG. 4 illustrates an exemplary vehicle system data scheme whereby data from two different vehicle systems in a vehicle can be related for presentation to a user. As shown, an on-board diagnostics (OBD) system 402 collects diagnostics data, such as events and errors and stores them in an exemplary diagnostics log 404. Also shown is a global positioning system (GPS) 406 that collects GPS data, such as position or location data, and stores them in an exemplary location log 408.

The diagnostics log 404 includes a code column 410 that includes one or more data fields for storing diagnostics codes related to events or errors that are detected by the OBD system 402 in the vehicle. The diagnostics log 404 also includes a time column 412 having data fields for storing timestamps indicating when associated diagnostics codes occurred. Thus, for example, an error having code P0534 was detected at 9:56. Diagnostics codes in the code column 410 are typically specified by a diagnostics specification, such as the OBDII standard. The diagnostics codes may be specific to the make, model, or type of vehicle. The timestamps in the time column 412 can be given in any time format, such as a twelve hour clock or twenty-four hour clock.

The location log 408 includes a location column 414 and a time column 416. The location column 414 has data fields for storing location information gathered by the GPS 406. The time column 416 includes data fields for storing timestamps indicating when the vehicle was at the locations in the location column 414. The location data in the location column 414 may be in any geographic data format, such as minutes and seconds, or decimal. As shown in FIG. 4, the exemplary location data specifies latitude and longitude in a decimal format (e.g., 34.05, −118.45).

A vehicle data management module 420 can read the data from the diagnostics log 404 and the location log 408 and create relationships between the location data and the diagnostics data. For example, the vehicle data management module 420 can determine the location of the vehicle when a particular vehicle error occurred. As illustrated, the error code P0534 occurred at 9:56 when the vehicle was located at 34.05, −118.45. The vehicle data management module 420 can associate a location with a code and transmit the location to a mapping application. The mapping application can present a marker on a map at the location to indicate where a particular diagnostics error was detected. The vehicle data management module 420 can be implemented with a relational database software application.

Although the diagnostics log 404 and the location log 408 are illustrated as relational tables, it is to be understood that the actual data need not be stored or manipulated in a table format. For example, in a particular implementation, an Application Specific Integrated Circuit (ASIC) may be used that has inputs for vehicle diagnostic codes and hardware mappings to one or more of the pieces of data shown in FIG. 4. In another implementation, software data structures, such as linked lists, objects, or others, can be used to create relations between vehicle system data and other useful data.

Figure 5:
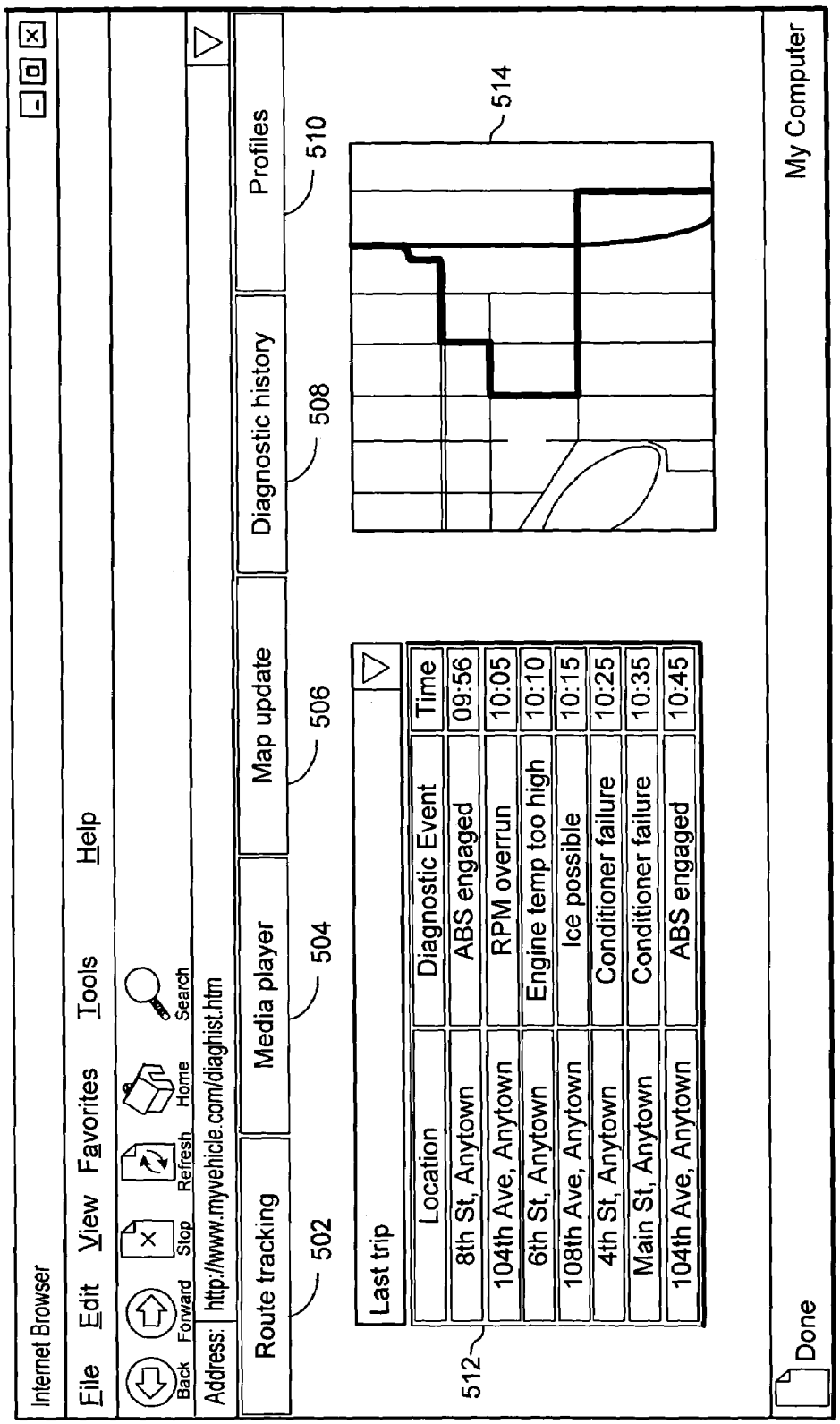
FIG. 5 illustrates an exemplary screenshot of the web page that can be generated by a vehicle-based server.

FIG. 5 illustrates a screen shot of an exemplary web page 500 that can be generated by a vehicle-based server. The web page 500 can be displayed by a web browser application (e.g., INTERNET EXPLORER from MICROSOFT) on a remote client. When connected to the Internet or any other standard network, the server may be accessed using a unique identifier (ID), for example Internet Protocol (IP) address. The connection can be made the same way as currently we connect to any internet server. To illustrate how a connection may be made, a remote user can type, for example, http://www.mycarname.com or http:/127.0.0. in the browser. After connecting to the server over the Internet, the remote user can request, upload, download, and otherwise manage in-vehicle data.

The web page 500 includes user-selectable symbols, such as a route tracking button 502, a media player button 504, a map update button 506, a diagnostic history button 508, and a profiles button 510, which enable the user to manage vehicle systems. When the user selects one of the buttons, a network request is sent to a vehicle-based server for information related to the selected button.

In response to the network request, the vehicle-based server provides a web page related to the selected vehicle system. As illustrated, a diagnostic history table 512 provides the user with a history of diagnostic events along with the locations and times of the events. For example, at 9:56 on 8$^{th}$ Street, the vehicle's antilock breaking system (ABS) was engaged. Also provided in the web page 500 is a map 514 showing roads traveled on the route (darker lines).

Exemplary Operations

Figure 6:
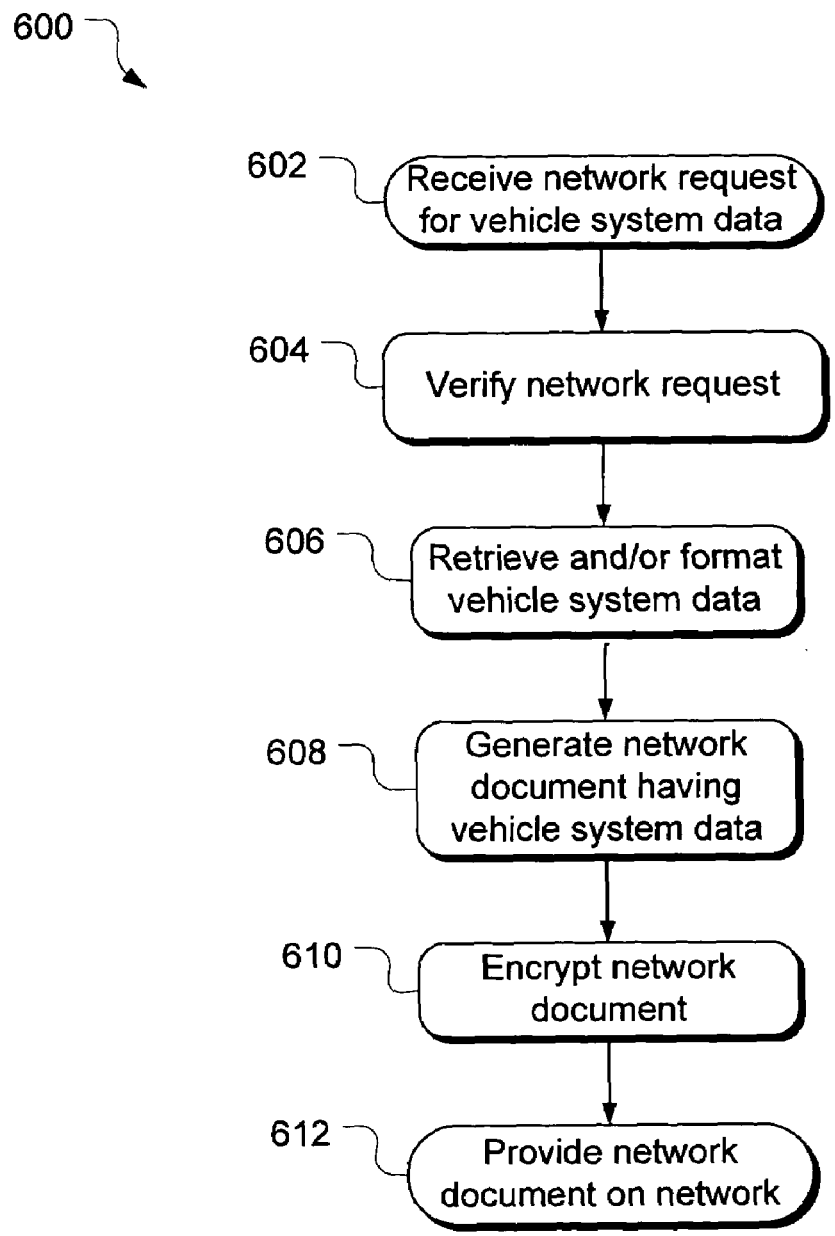
FIG. 6 illustrates a flowchart having exemplary operations for remotely managing one or more vehicle computer systems.

FIG. 6 is an operation flow 600 having exemplary operations the may be performed by a vehicle-based computer for remotely managing vehicle systems in a vehicle. The exemplary operations in the operation flow 600 may be performed periodically while the vehicle is being operated. While the exemplary operations are illustrated in a particular sequence in FIG. 6, it is to be understood that the exemplary operations can be performed in other sequences other than the sequence shown in FIG. 6, depending on the particular implementation.

Prior to the operation flow 600, it is assumed that vehicle system data has been gathered from one or more vehicle systems. Gathering vehicle system data involves requesting vehicle system data from the one or more vehicle systems in real-time. The vehicle system data may be formatted and/or stored in a memory in the vehicle-based computer where the data is accessible to subsequent operations in the operation flow 600.

A receiving operation 602 receives a network request for at least a subset of the vehicle system data. The network request may come from a remote client or a local client. The request is typically is formatted according to a network protocol such as a TCP/IP or HTTP protocol, and has a network identifier (e.g., and Internet Protocol (IP) address) associated with the vehicle-based computer. The receiving operation 602 recognizes the request as being directed to the vehicle-based computer, decodes the request, and identifies which vehicle system data is being requested. The receiving operation 602 is optional.

If a network request is received for vehicle system data and/or enhanced vehicle event information, a verifying operation 604 verifies the validity of the network request. In one implementation of the verifying operation 604, the network request is decrypted. Verifying may also involve validating the identity of the requesting client.

The retrieving operation 606 retrieves vehicle system data from the vehicle system data from memory. The retrieving operation 606 may retrieve "standard" vehicle system data of predetermined types. For example, the vehicle-based computer may automatically retrieve all OBD codes so that the OBD codes can be presented to a user. Alternatively, the retrieving operation 606 may retrieve vehicle system data that was requested in the receiving operation 604.

The generating operation 608 generates one or more network documents, such as web pages, that include subsets of the vehicle system data that were gathered. The generating operation 608 may generate "standard" network documents with predetermined subsets of the vehicle system data. Alternatively, or in addition, the generating operation 608 may generate one or more network documents with requested vehicle system data specified in a network request received in the receiving operation 606.

One implementation of the generating operation 608 involves using a common gateway interface (CGI) to dynamically generate a hypertext markup language (HTML) web page having vehicle system data. The vehicle system data included in the HTML web page can be a predetermined subset of the vehicle system data that was gathered from the vehicle systems. Alternatively, the vehicle system data included in the HTML can be selected based on a network request for the data.

Another implementation of the generating operation 608 involves generating active server pages (ASP) that include the vehicle system data. An ASP application may enable more variation in the types of vehicle system data that are presented in the web page, as well as more flexibility in the presentation format of the vehicle system data.

An encrypting operation 610 encrypts the generated network document to achieve some level of information security. Examples of encrypting algorithms that may be employed by the encrypting operation 610 are data encryption standard (DES), RSA, and hashing algorithms.

A providing operation 612 makes the generated network document(s) available to network document reader applications, such as browsers. The providing operation 612 may transmit one or more network documents over the network according to the network protocol. For example, the providing operation 1612 can transmit web pages over the Internet to a client where the web pages can be viewed by a browser.

Figure 7:
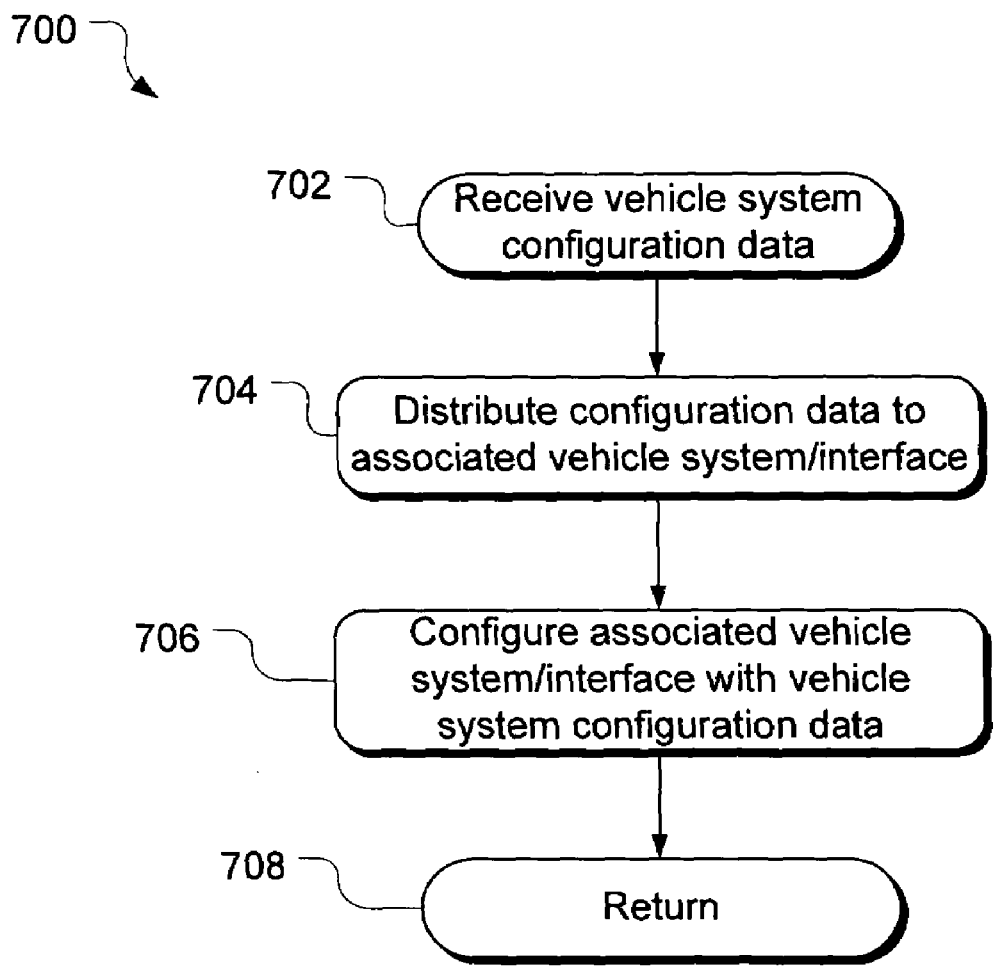
FIG. 7 illustrates a flowchart having exemplary operations for remotely configuring data for one or more configurable vehicle computer systems.

FIG. 7 is another operation flow 700 illustrating exemplary operations for configuring a vehicle system with vehicle system data. The operation flow 700 may be advantageously executed to update map data, media, user configuration data, vehicle settings, and other vehicle data. For example, the latest geographic information system (GIS) data may be downloaded for a city that the driver visits frequently. The operation flow 700 can be carried out by a vehicle-based server computer or other vehicle-based computer, such as the vehicle-based computers illustrated and described in FIG. 2.

Referring specifically to the operation flow 700, a receiving operation 702 receives vehicle system configuration data in a vehicle-based computer. The vehicle system configuration data can be received over a network or received from a device or media in the vehicle. For example, the vehicle system configuration data can be received from another vehicle-based computer, a remote computer, a remote server, a portable computing device, a portable memory media, or other devices or media.

In a distributing operation 704, the received vehicle system configuration data is distributed to a vehicle system associated with the received vehicle system configuration data. Distributing the received data may include storing the received data in a memory location used by the associated vehicle system. Thus, for example, media that is received from a network can be stored in a memory area used by an entertainment system. As another example, map or GIS data can be stored in a memory area used by a mapping application. As yet another example, diagnostics code data can be used to initialize actions in an on-board diagnostic system. The distributing operation 704 may format the received configuration data according to a format readable by the associated vehicle system.

A configuring operation 706 configures the vehicle system or interface corresponding to the received configuration data. During the configuring operation 706, vehicle systems and interfaces are notified that there is new configuration data to consume. In response, the notified systems and interfaces will read the configuration data so that the systems and interfaces are up to date. The configuring operation 706 may be optional depending on vehicle system implementation, protocols, and/or design. The operation 700 ends at a return operation 708.

Figure 8:
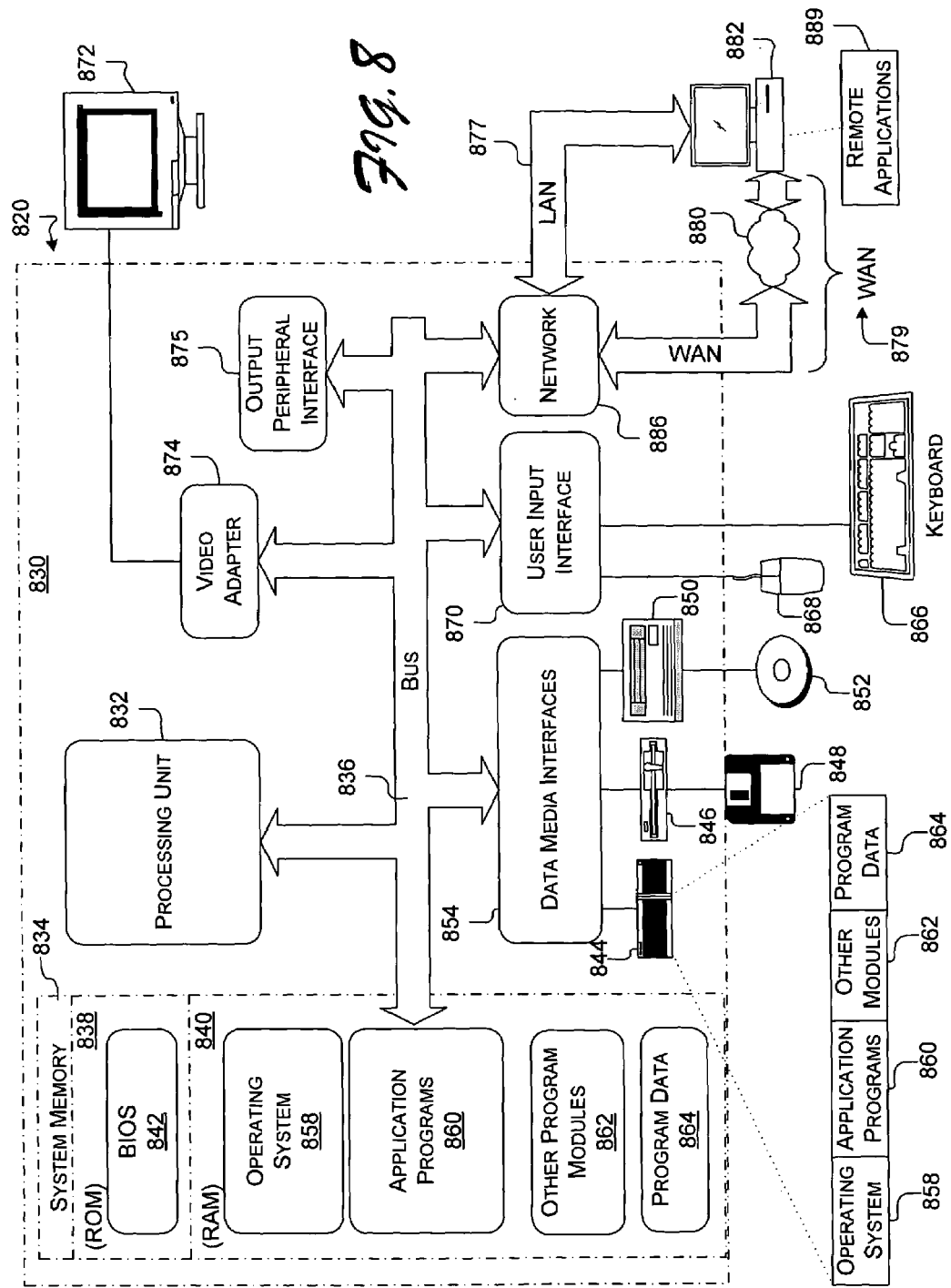
FIG. 8 illustrates a suitable computing environment in which vehicle systems management may be implemented.

Exemplary Computer System that may be used to Implement a Remote Vehicle Management System FIG. 8 and the corresponding discussion are intended to provide a general description of a suitable computing environment in which the described arrangements and procedures for managing vehicle systems may be implemented. Exemplary computing environment 820 is only one example of a suitable computing environment and is not intended to suggest any limitation as to the scope of use or functionality of the described subject matter. Neither should the computing environment 820 be interpreted as having any dependency or requirement relating to any one or combination of components illustrated in the exemplary computing environment 820.

The exemplary arrangements and procedures to transport computer data between interconnected devices are operational with numerous other general purpose or special purpose computing system environments or configurations. Examples of well known computing systems, environments, and/or configurations that may be suitable for use with the described subject matter include, but are not limited to, personal computers, server computers, thin clients, thick clients, hand-held or laptop devices, multiprocessor systems, microprocessor-based systems, distributed computing environments such as server farms and corporate intranets, and the like, that include any of the above systems or devices.

The computing environment 820 includes a general-purpose computing device in the form of a computer 830. The computer 830 may include and/or serve as an exemplary implementation of a vehicle-based computer for remote vehicle system management described above with reference to FIGS. 1-7. The computer 830 may also include and/or serve as an exemplary implementation of a network-based client, server, or other computing device that may be in communications with the vehicle-based computer. The components of the computer 830 may include, by are not limited to, one or more processors or processing units 832, a system memory 834, and a bus 836 that couples various system components including the system memory 834 to the processor 832.

The bus 836 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The computer 830 typically includes a variety of computer readable media. Such media may be any available media that is accessible by the computer 830, and it includes both volatile and non-volatile media, removable and non-removable media.

The system memory includes computer readable media in the form of volatile memory, such as random access memory (RAM) 840, and/or non-volatile memory, such as read only memory (ROM) 838. A basic input/output system (BIOS) 842, containing the basic routines that help to communicate information between elements within the computer 830, such as during start-up, is stored in ROM 838. The RAM 840 typically contains data and/or program modules that are immediately accessible to and/or presently be operated on by the processor 832.

The computer 830 may further include other removable/non-removable, volatile/non-volatile computer storage media. By way of example only, FIG. 8 illustrates a hard disk drive 844 for reading from and writing to a non-removable, non-volatile magnetic media (not shown and typically called a "hard drive"), a magnetic disk drive 846 for reading from and writing to a removable, non-volatile magnetic disk 848 (e.g., a "floppy disk"), and an optical disk drive 850 for reading from or writing to a removable, non-volatile optical disk 852 such as a CD-ROM, DVD-ROM or other optical media. The hard disk drive 844, magnetic disk drive 846, and optical disk drive 850 are each connected to bus 836 by one or more interfaces 854.

The drives and their associated computer-readable media provide nonvolatile storage of computer readable instructions, data structures, program modules, and other data for the computer 830. Although the exemplary environment described herein employs a hard disk, a removable magnetic disk 848 and a removable optical disk 852, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 848, optical disk 852, ROM 838, or RAM 840, including, by way of example, and not limitation, an operating system 858, one or more application programs 860, other program modules 862, and program data 864. Application programs 860 may include a remote vehicle system management application for remotely accessing, uploading, or downloading vehicle system data to and from a vehicle-based computer.

A user may enter commands and information into the computer 830 through optional input devices such as a keyboard 866 and a pointing device 868 (such as a "mouse"). Other input devices (not shown) may include a microphone, joystick, game pad, satellite dish, serial port, scanner, or the like. These and other input devices are connected to the processing unit 832 through a user input interface 870 that is coupled to the bus 836, but may be connected by other interface and bus structures, such as a parallel port, game port, or a universal serial bus (USB).

An optional monitor 872 or other type of display device is connected to the bus 836 via an interface, such as a video adapter 874. In addition to the monitor, personal computers typically include other peripheral output devices (not shown), such as speakers and printers, which may be connected through output peripheral interface 875.

The computer 830 may operate in a networked environment using logical connections to one or more remote computers, such as a remote computer 882. The remote computer 882 may include many or all of the elements and features described herein relative to the computer 830. The logical connections shown in FIG. 8 are a local area network (LAN) 877 and a general wide area network (WAN) 879. In a vehicle-based computer, the LAN 877 and/or the WAN 879 are typically composed of wireless networks. In a network-based computing device, the LAN 877 and/or WAN 879 may be composed of wired networks, wireless networks, or any combination of wired or wireless networks. Such networking environments are commonplace in offices, enterprise-wide computer networks, intranets, and the Internet.

When used in a LAN networking environment, the computer 830 is connected to the LAN 877 via a network interface or an adapter 886. The network interface 886 provides communications services for transmitting and receiving data to and from one or more clients. For example, the network interface 886 formats, encodes, modulates, demodulates, and decrypts data communicated via the LAN 877. The network interface 886 operably communicates over a network using a standard network communication protocol. Examples of communications devices suitable for the network interface 886 in a vehicle-based server computer include a cellular modem, Wireless Fidelity (WiFi), or other wireless communications devices.

The network adapter 886 may also be used to facilitate communications in a WAN 879 networking environment. As such, the computer 830 typically communicates via the network adapter 886 or other means for establishing communications over the WAN 879. The network adapter 886, which may be internal or external, may be connected to the system bus 836 via the user input interface 870 or other appropriate mechanism. Depicted in FIG. 8 is a specific implementation of a WAN via the Internet.

In a networked environment, program modules depicted relative to the personal computer 830, or portions thereof, may be stored in a remote memory storage device. By way of example, and not limitation, FIG. 8 illustrates remote application programs 889 as residing on a memory device of remote computer 882. It will be appreciated that the network connections shown and described are exemplary and other means of establishing a communications link between the computers may be used.

Although some exemplary methods, devices and exemplary systems have been illustrated in the accompanying drawings and described in the foregoing detailed description, it will be understood that the methods and systems are not limited to the exemplary embodiments disclosed, but are capable of numerous rearrangements, modifications and substitutions without departing from the spirit set forth and defined by the following claims.

What is claimed is:

1. A method comprising:
   generating from a vehicle-based network server a browsable network document including vehicle system data from one or more vehicle systems;
   providing the browsable network document over a network to enable remote viewing of the vehicle system data;
   displaying a web page based on the browsable network document.

2. A method as recited in claim 1 further comprising collecting vehicle system data from one or more independent vehicle systems in a vehicle, each of the independent vehicle systems generating a distinct type of vehicle system data.

3. A method as recited in claim 1 further comprising transmitting the network document over a network.

4. A method as recited in claim 1 further comprising receiving a network request for the vehicle system data.

5. A method as recited in claim 1 further comprising relating vehicle system data from a first independent vehicle system to vehicle system data from a second independent vehicle system, each of the first independent vehicle system and the second independent vehicle system generating distinct vehicle system data.

6. A method comprising:
   generating from a vehicle-based network server a browsable network document including vehicle system data from one or more vehicle systems, wherein the generating step comprises generating a network document having an embedded object;
   providing the browsable network document over a network to enable remote viewing of the vehicle system data.

7. A method as recited in claim 1 wherein the generating step comprises populating a mark-up language document with the vehicle system data.

8. A method comprising:
   generating from a vehicle-based network server a browsable network document including vehicle system data from one or more vehicle systems, wherein the generating step comprises creating an active sewer pages web page;
   providing the browsable network document over a network to enable remote viewing of the vehicle system data.

9. A method as recited in claim 2 wherein the collecting operation comprises gathering vehicle system data from at least one of an on-board diagnostic (OBD) system, a global positioning system (GPS), a vehicle video system, a vehicle security system, and an obstacle detection system.

10. A method comprising:
    generating from a vehicle-based network server a browsable network document including vehicle system data from one or more vehicle systems,
    providing the browsable network document over a network to enable remote viewing of the vehicle system data;
    collecting vehicle system data from one or more independent vehicle systems in a vehicle, each of the independent vehicle systems generating a distinct type of vehicle system data, wherein the collecting operation comprises gathering vehicle system data from at least one of an on-board diagnostic (OBD) system, a global positioning system (GPS), a vehicle video system, a vehicle security system, and an obstacle detection system;
    using the OBD system data and the GPS data to generate a map including a mark at a geographic location where an OBD event occurred.

11. A method as recited in claim 1 further comprising receiving vehicle system configuration information to configure one or more of the vehicle systems.

12. A method as recited in claim 11 wherein the receiving operation comprises receiving at least one of vehicle user profile data, media data, vehicle diagnostics data, map data, and geographic information system data.

13. A method as recited in claim 11 wherein the receiving operation comprises receiving the vehicle system configuration information from a remote client.

14. A method as recited in claim 2 further comprising storing the vehicle system data in a relational database.

15. A vehicle comprising:
    a web server operable to gather vehicle system data from one or more independent vehicle systems in the vehicle and generate a browsable network document including the vehicle system data, wherein the browsable network document includes an embedded object.

16. A vehicle as recited in claim 15, wherein the web server comprises a network transmitter transmitting the browsable network document over a network.

17. A vehicle as recited in claim 15, wherein the web server comprises a network receiver receiving a network request for a subset of the vehicle system data.

18. A vehicle as recited in claim 15, wherein the web server comprises processor-executable code that cause a processor to relate vehicle system data from a first vehicle system to vehicle system data from a second vehicle system.

19. A vehicle as recited in claim 15, wherein the browsable network document comprises a hypertext markup language document.

20. A vehicle as recited in claim 15 further comprising two or more of:
an on-board diagnostics (OBD) system;
a global positioning system (GPS);
a vehicle video source;
a vehicle security system; and
an obstacle detection system, wherein the OBD system, the GPS system, the vehicle video source, the vehicle security system, and the obstacle detection system are in communication with the web server.

21. A vehicle comprising:
a web server operable to gather vehicle system data from one or more independent vehicle systems in the vehicle and generate a browsable network document including the vehicle system data;
a relational database storing data from the ODB system, the GPS system, the vehicle video source, the vehicle security system, and the obstacle detection system.

22. A vehicle as recited in claim 15, the web server further operable to configure one or more of the vehicle systems using vehicle system configuration data received from a remote client.

23. A vehicle comprising:
a web server operable to gather vehicle system data from one or more independent vehicle systems in the vehicle and generate a browsable network document including the vehicle system data, wherein the web server further comprises an encryption module operable to encrypt the browsable network document.

24. A computer-readable medium having stored thereon computer-executable instructions for performing a computer process comprising:
generating from a vehicle-based network server a browsable network document including vehicle system data from one or more vehicle systems;
providing the browsable network document over a network to enable remote viewing of the vehicle system data;
displaying a web a based on the browsable network document.

25. A computer-readable medium as recited in claim 24 further comprising collecting vehicle system data from one or more independent vehicle systems in a vehicle, each of the independent vehicle systems generating a distinct type of vehicle system data.

26. A computer-readable medium as recited in claim 24 further comprising transmitting the network document over a network.

27. A computer-readable medium as recited in claim 24 further comprising receiving a network request for the vehicle system data.

28. A computer-readable medium as recited in claim 24 further comprising relating vehicle system data from a first independent vehicle system to vehicle system data from a second independent vehicle system, each of the first independent vehicle system and the second independent vehicle system generating distinct vehicle system data.

29. A computer-readable medium having stored thereon computer-executable instructions for performing a computer process comprising:
generating from a vehicle-based network server a browsable network document including vehicle system data from one or more vehicle systems, wherein the generating step comprises generating a network document having an embedded object;
providing the browsable network document over a network to enable remote viewing of the vehicle system data.

30. A computer-readable medium as recited in claim 24 wherein the generating step comprises populating a mark-up language document with the vehicle system data.

31. A computer-readable medium having stored thereon computer-executable instructions for performing a computer process comprising:
generating from a vehicle-based network server a browsable network document including vehicle system data from one or more vehicle systems, wherein the generating step comprises creating an active server pages web page;
providing the browsable network document over a network to enable remote viewing of the vehicle system data.

32. A computer-readable medium as recited in claim 25 wherein the collecting operation comprises gathering vehicle system data from at least one of an on-board diagnostic (OBD) system, a global positioning system (GPS), a vehicle video system, a vehicle security system, and an obstacle detection system.

33. A computer-readable medium as recited in claim 32 further comprising using the OBD system data and the GPS data to generate a map including a mark at a geographic location where an OBD event occurred.

34. A computer-readable medium having stored thereon computer-executable instructions for performing a computer process comprising:
generating from a vehicle-based network server browsable network document including vehicle system data from one or more vehicle systems;
providing the browsable network document over a network to enable remote viewing of the vehicle system data;
receiving vehicle system configuration information to configure one or more of the vehicle systems.

35. A computer-readable medium as recited in claim 34 wherein the receiving operation comprises receiving at least one of vehicle user profile data, media data, vehicle diagnostics data, map data, and geographic information system data.

36. A computer-readable medium as recited in claim 35 wherein the receiving operation comprises receiving the vehicle system configuration information from a remote client.

37. A computer-readable medium as recited in claim 35 further comprising storing the vehicle system data in a relational database.

* * * * *

UNITED STATES PATENT AND TRADEMARK OFFICE
CERTIFICATE OF CORRECTION

| | | |
|---|---|---|
| PATENT NO. | : 7,317,974 B2 | Page 1 of 1 |
| APPLICATION NO. | : 10/734515 | |
| DATED | : January 8, 2008 | |
| INVENTOR(S) | : Eugene Luskin et al. | |

It is certified that error appears in the above-identified patent and that said Letters Patent is hereby corrected as shown below:

In column 14, line 17, in Claim 8, delete "sewer" and insert -- server --, therefor.

In column 15, line 26, in Claim 21, delete "ODB" and insert -- OBD --, therefor.

In column 15, line 49, in Claim 24, after "a web" delete "a" and insert -- page --, therefor.

In column 16, line 42, in Claim 34, after "server" insert -- a --.

Signed and Sealed this
First Day of February, 2011

David J. Kappos
*Director of the United States Patent and Trademark Office*